Aug. 15, 1972   R. J. LEHNEN ET AL   3,684,583
RECHARGEABLE CELL HOLDER
Filed Feb. 23, 1971
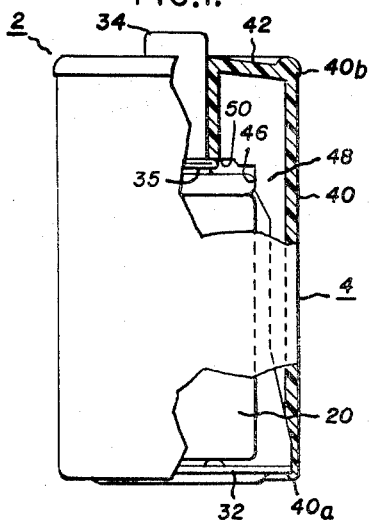
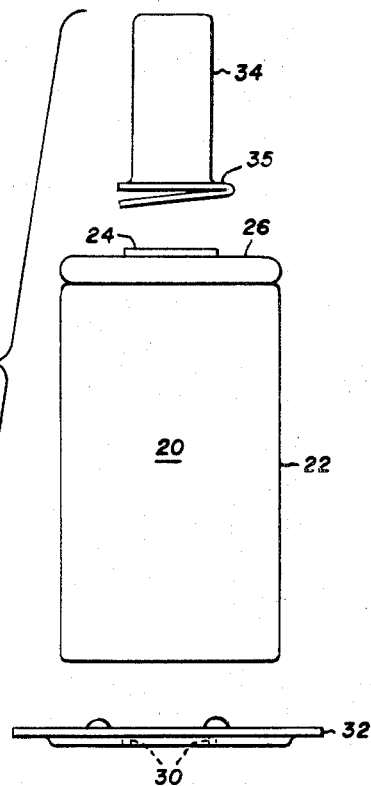
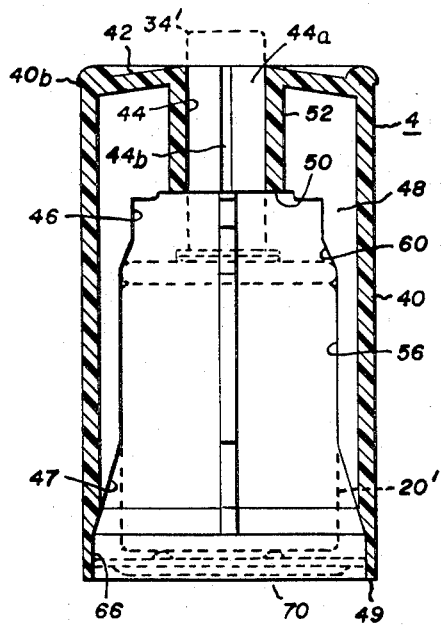
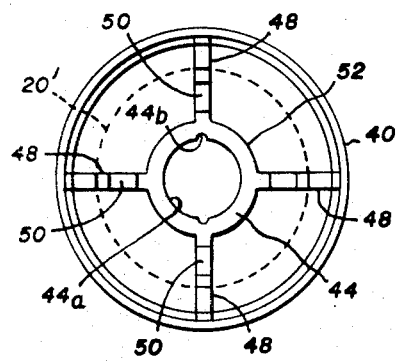
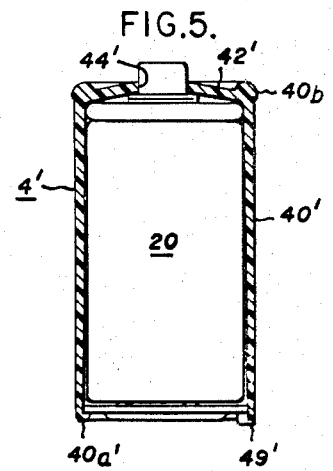
INVENTORS:
ROBERT J. LEHNEN,
RAYMOND K. SUGALSKI,
BY *John P. Taylor*
THEIR ATTORNEY.

3,684,583
RECHARGEABLE CELL HOLDER
Robert J. Lehnen and Raymond K. Sugalski, Gainesville, Fla., assignors to General Electric Company
Filed Feb. 23, 1971, Ser. No. 118,067
Int. Cl. H01m 1/04
U.S. Cl. 136—173    2 Claims

ABSTRACT OF THE DISCLOSURE

An improved rechargeable cell is provided comprising an inner cell having a metallic casing with positive and negative electrodes and an electrolyte within the metal casing. An external non-metallic cylindrical case surrounds the metal casing. The non-metallic case has external dimensions, i.e. diameter and length which conform to conventional predetermined cell sizes such as C size and D size cells. The non-metallic case is provided with internal means to center the inner cell therein. An electrode connector coaxially positioned on the internal cell protrudes through a centrally formed aperture on one end wall of the non-metallic case. An enlarged second electrode connector which is attached to the opposite end of the internal cell has an exterior diameter substantially equal to the internal diameter of the non-metallic casing. These elements cooperate to position the internal cell within the non-metallic casing.

BACKGROUND OF THE INVENTION

Rechargeable cells such as the cells, for example, shown in Sugalski U.S. Pat. No. 3,503,806 issued Mar. 31, 1970 and assigned to the assignee of this invention are well known. Such cells find common use in ever increasing numbers within portable electric devices such as, for example, electric tooth brushes. The voltage of the cell is, of course, determined by the electrode materials used. The ampere-hour capacity of the cells is determined by the size of the electrodes. Since the cell, however, is rechargeable, the size of the electrodes and therefore the ampere-hour of capacity does not determine the life of the cell but rather the amount of operating time between charges. Therefore, it has been found convenient to manufacture cells of relatively small dimensions compared to the conventional carbon-zinc C cells and D cells which have been widely used in the past. The smaller cell is, of course, more attractive from a packaging standpoint for inclusion within portable devices.

However, for reasons of economics in manufacture, it is advantageous to utilize the same cell in a rechargeable cell manufactured to conventional C size and D size for use in battery operated appliances which are designed for removable batteries including dry cells.

A prior art approach to this problem has been to use a cardboard or fiberboard sleeve having an internal dimension generally conforming to the external diameter of the rechargeabe cell and having an exterior diameter and length conforming to the general dimensions of a C cell or a D cell. Several problems, however, have been encountered with this type of construction. Tolerances in both the inner diameter and outer diameter of the fiberboard sleeve are very broad because of the difficulty in manufacturing such a sleeve to more close tolerances. The result can be either a loose fit of the internal cell within the sleeve or difficulty in insertion of the cell into the sleeve if the internal diameter is too small. The variation in the external diameter of the sleeve makes it difficult to utilize automatic packaging equipment, for example, to attach labels and external protective plastic sleeves over the sidewalls of the outer case of the cell.

It is therefore an object of the invention to provide an improved rechargeable cell having outer dimensions conforming to conventional sizes.

It is a further object of the invention to provide a cell having an outer non-metallic casing and an internal rechargeable cell therein with means to generally centrally position the internal cell within the outer non-metallic casing. These and other objects of the invention will become apparent from the description of the drawings.

In accordance with the invention, an improved rechargeable cell is provided comprising an internal cell having a metal casing containing two electrodes and an electrolyte and having external positive and negative terminals thereto. An external non-metallic casing surrounds this internal cell and contains means positioned therein to coaxially center said internal cell within the non-metallic casing. One of the terminals is centrally positioned on one end of the internal cell and is received in an opening centrally formed in a first end wall of the external case. The other electrode terminal comprises a cylindrical plate fastened to the opposite end of the internal cell and having a diameter approximately equal to the internal diameter of the non-metallic case. The non-metallic case also contains central positioning means to engage preselected portions of the internal cell to centrally position the cell within the non-metallic case.

BRIEF DESCRIPTION OF THE DRAWINGS

FIG. 1 is a partially broken-away horizontal view of the cell of the invention.
FIG. 2 is a horizontal partially broken-away view of a portion of FIG. 1.
FIG. 3 is a horizontal cross-section view of the cell of FIG. 1.
FIG. 4 is a vertical cross-section view of the cell in FIG. 1.
FIG. 5 is an alternate embodiment of the construction shown in FIGS. 3 and 4.

DESCRIPTION OF THE PREFERRED EMBODIMENT

Referring now to FIG. 1 a cell is generally shown at 2 which comprises an external non-metallic case 4 surrounding an internal cell generally indicated at 20. Internal cell 20 as more clearly shown in FIG. 2 is of conventional construction as illustrated in Sugalski U.S. No. 3,503,806 previously referred to. Cell 20 generally comprises a positive electrode and a negative electrode and an electrolyte communicating therebetween housed in a sealed metallic casing 22 having a high pressure safety valve more fully described in the above patent. One of the electrodes is electrically attached to metallic case 22 which forms one cell terminal. The other electrode is attached to an external terminal 24 which is centrally located in insulated cover 26 on the top of cell 20.

An auxiliary terminal 32 comprises a circular metallic disc of somewhat larger diameter than the diameter of cell 20. Circular terminal 32 is conventionally attached as by welding to metallic case 22. A second auxiliary terminal 34 comprising a tubular member having a closed end is attached to terminal 24 by welding a tab on terminal 34 directly to terminal 24. Auxiliary terminals 32 and 34 serve as extensions of the basic terminals on cell 20 for a reason which will be presently described.

Referring now more specifically to FIGS. 3 and 4 an external non-metallic case 4 generally comprises a plastic case which may be formed, for example, of an ABS resin such as Cycolac available from the Marbon Division of Borg-Warner. The external dimensions of cylindrical sidewall 40 of case 4 generally conform to the diameter of either a C cell or a D cell so that the rechargeable cell of the invention can be interchangeably used in place of the conventional dry cell. Likewise, the length of sidewall 40 is sized to conform to the conventional C or D size depending upon the particular application.

Plastic case 4 is formed with an end wall 42 having a coaxially positioned aperture 44 which generally conforms in diameter to the diameter of auxiliary terminal 34 of internal cell 20. A larger bore 46 which generally conforms to the diameter of cell 20 is formed within casing 4 by a plurality of ribs 48 which inwardly protrude from the cylindrical outer wall 40 of case 4. If desired, for ease of insertion of cell 20, bore 46 may be slightly tapered inwardly toward end wall 42 to provide a snug, interference fit when the internal cell 20 is fully inserted into bore 46.

In the embodiment illustrated in FIGS. 3 and 4, ribs 48 extend inwardly adjacent end wall 42 and are joined together by a coaxially positioned sleeve 62 which extends downwardly from end wall 42. The internal bore 44a of sleeve 52 is of the same diameter as aperture 44 and thus serves as an extension of aperture 44 to receive and support auxiliary terminal 34. The end of sleeve 52 defines a stop 50 which engages a lip 35 on terminal 34 to act as a stop when cell 20, having auxiliary electrodes 32 and 34 thereon, is inserted into bore 46.

Ribs 48, as seen in FIG. 3, are further cut back adjacent the bottom of case 4 to define, a second, larger bore 56 with a slightly tapered portion 60 extending between the bores. This construction permits the use of an alternate internal cell 20' having a larger diameter approximately bore 56 and a shortened height. When internal cell 20' is inserted in casing 4, tapered portion 60 acts as a stop engaging the top portion of internal cell 20'.

To assemble the cell of the invention, internal cell 20, having auxiliary terminals 32 and 34 attached thereto, is inserted into bore 46 of casing 4 through open end 70. When cell 20 is inserted into case 4 auxiliary terminal 34 is received in bore 44a and lip 35 of auxiliary electrode 34 on cell 2 butts against stop 5 on sleeve 52.

Auxiliary terminal 34 is dimensioned in height to slightly protrude from aperture 44 when internal cell 20 is inserted to the full depth of bore 46 and lip 35 is engaged by stop 50. Auxiliary terminal 32 has an outer diameter which generally conforms to the diameter of a bore 66 comprising the inner diameter of wall 40 of case 4. It should be noted here that rib 48 terminates at 47 which is spaced from the open end 49 of sidewall 40.

The inner depth of the case 4 from end 49 to stop 50, i.e. approximately the combined depths of bores 46, 56, and 66, is dimensioned to be slightly larger than cell 20 so that when lip 35 engages stop 50, a small portion 40a of wall 40 will extend beyond the bottom of auxiliary terminal 32. To retain internal cell 20 within casing 4, a small portion 40a of wall 40 is rolled over against the bottom of terminal 32 with a hot die which causes the plastic material to form a bead around the end of the periphery of terminal 32 and thereby mechanically seal or lock internal cell 20 within case 4.

As previously mentioned, internal cell 20 contains a high pressure safety valve to allow escape of any gases which may be inadvertently generated with cell 20. To allow such gases to pass through the outer case 4, vent means are provided in cell 2. These vent means comprise openings 30 in terminal 32 as shown in dotted lines in FIG. 2 and relieved portions 44b in bore 44a of sleeve 52 as shown in FIG. 4.

After cell 2 has been assembled, a label (not shown) can be adhesively attached to sidewall 40 of case 4. To mitigate wear and defacement of the label during insertion and removal of the cell for recharging, a protective lip 40b is molded into case 4 to form a diameter at the top of cell 2 which will be slightly larger than the remainder of the cell even after attachment of the label. It should be noted here that mitigation of the wear and defacement of the label of a rechargeable cell is important because of the long life of the cell and the repeated insertion and removal of the cell for charging purposes, unlike the relatively short life, of a dry cell.

As mentioned previously, the case 10 is constructed to be useful with other internal cells such as cell 20' shown in dotted lines in FIG. 3 having a diameter approximately that of bore 56 in case 4. When cell 20' is used, a modified auxiliary terminal 34' is also used which is longer than terminal 34 to compensate for the shorter height of cell 20'. In either embodiment it should be noted that the terminal (34 or 34') is of one piece, tubular construction and welded, via an integral tab on terminal 34 (or 34'), to terminal 24 on the internal cell. This secure mounting of a rigid auxiliary terminal to terminal 24 on the internal cell together with the mounting of terminal 34 (or 34') in aperture 44 of case 4 provides additional securement of the internal cell within case 4 thereby providing a more durable overall assembly of cell 2 of the invention.

Referring now to FIG. 5 an alternate embodiment is shown wherein casing 4' is formed with a tapered cylindrical wall 40' which is thicker adjacent end wall 42' and thinner adjacent the opposite end or opening 49'. In this embodiment cell 20, when inserted, is gradually grasped by the narrowing inner wall or bore of sidewall 40'. As in the embodiment shown in FIGS. 3 and 4 the depth of the insertion of cell 20 within casing 40' is determined by the engagement of end wall 42' of the outer case with cover 26 of internal cell 20. Similarly, the cell 20 is locked within case 4' by the rolling over of the portion 40a' of sidewall 40' adjacent end 49'. The embodiment shown in FIGS. 3 and 4 is preferred for the construction of a D size cell wherein the total exterior dimensions of the desired cell is substantially larger than that of internal cell 20. The embodiment shown in FIG. 5 is, however, preferred when a C size is desired which will only be slightly larger than the outer dimensions of internal cell 20.

Thus, a single size internal cell can be used to construct a series of various external sizes of cells such as the C and D size cells which are commonly used in flashlights and the like. By constructing the outer case of a non-metallic plastic material which can be molded, a substantial gain can be realized both in economics and in dimensional stability and accuracy of the final product thereby enabling the use of automatic equipment to produce the cell. While specific embodiments have been illustrated, it will be obvious to those skilled in the art that minor modifications may be made without departing from the spirit of the invention which is to be limited only by the scope of the appended claims.

What we claim as new and desire to secure by Letters Patent of the United States is:

1. An improved rechargeable cell comprising
   (a) an internal cell having:
      (1) a metallic cylindrical casing,
      (2) a pair of electrodes within said casing, one of which is electrically connected to said casing, and the other electrode being electrically connected to a terminal on the casing in insulated relationship thereof,
      (3) an electrolyte within said casing communicating with said electrodes,
      (4) a first auxiliary terminal comprising a tubular member coaxially positioned externally at one of said cylindrical casing rigidly mounted to said terminal on said casing and having a diameter smaller than said casing,
      (5) an enlarged second auxiliary terminal comprising a disc-like member coaxially positioned externally at the opposite end of said casing, electrically communicating with said casing, and having a diameter larger than said casing.
   (b) an external non-metallic cylindrical case having an external diameter and length conforming to a predetermined conventional size and having:
      (1) a first end wall thereon having a central opening therein to receive said first auxiliary terminal,
(2) positioning means within said case to peripherally engage said metallic casing, and
(3) an internal diameter adjacent the end of said case opposite said first end wall substantially conforming to the diameter of said second auxiliary terminal.

2. An improved rechargeable cell comprising an internal cell and an exterior cylinder casing having an external diameter and length conforming to a conventional cell size comprising:
(a) a ventable, sealed, rechargeable cell comprising a casing having terminals thereon electrically connected respectively to a positive electrode and a negative electrode within said casing and having an an electrolyte therein ionically interconneding said electrodes, (b) an outer, molded plastic casing having an outer diameter and length conforming to conventional cell sizes, internal means spaced about an internal bore of said casing to circumferentially engage preselected portions of the casing of said cell, and an end wall having a reduced central bore therein to receive a tubular auxiliary terminal coaxially mounted rigidly to one of said terminals on said internal cell.

References Cited
UNITED STATES PATENTS

| | | | |
|---|---|---|---|
| 2,886,623 | 5/1959 | Lehr | 136—173 |
| 3,473,966 | 10/1969 | Fritch | 136—173 |
| 3,503,806 | 3/1970 | Sugalski | 136—13 |

ANTHONY SKAPARS, Primary Examiner